United States Patent
Jia et al.

(10) Patent No.: US 11,191,026 B1
(45) Date of Patent: Nov. 30, 2021

(54) METHODS AND SYSTEMS FOR INCREASED POWER SAVE EFFICIENCY IN WIRELESS COMMUNICATIONS NETWORKS

(71) Applicant: HEWLETT PACKARD ENTERPRISE DEVELOPMENT LP, Houston, TX (US)

(72) Inventors: Xuguang Jia, Beijing (CN); Qiang Zhou, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/926,591

(22) Filed: Jul. 10, 2020

(51) Int. Cl.
*H04W 52/02* (2009.01)
*H04W 76/10* (2018.01)

(52) U.S. Cl.
CPC ....... *H04W 52/0258* (2013.01); *H04W 76/10* (2018.02)

(58) Field of Classification Search
CPC .......................... H04W 52/0258; H04W 76/10
USPC .................. 370/311; 455/13.4, 127.1–127.5, 455/343.1–343.6, 522, 572–574
See application file for complete search history.

(56) References Cited

U.S. PATENT DOCUMENTS

| | | | | |
|---|---|---|---|---|
| 2004/0190467 A1* | 9/2004 | Liu | ............... | H04W 52/0216 370/311 |
| 2005/0152324 A1* | 7/2005 | Benveniste | .......... | H04W 28/10 370/338 |
| 2009/0296617 A1* | 12/2009 | Lin | ...................... | H04W 76/28 370/311 |

* cited by examiner

*Primary Examiner* — Michael Y Mapa
(74) *Attorney, Agent, or Firm* — Sheppard Mullin Richters Hampton LLP

(57) ABSTRACT

Systems and methods are provided for increasing power save efficiency of stations within a wireless communications network. An access point (AP) can receive one or more session requests to establish a session from a station, each session request including one or more requested session parameters. The AP can set the session parameters to ensure that a session period of each requested session does not overlap two or more target beacon transmission time (TBTT) frames. The AP can merge two or more session periods of the one or more sessions by calculating a session period offset to align the end time of two or more session periods. Merging the two or more session periods minimizes the total wake time of the station.

20 Claims, 11 Drawing Sheets

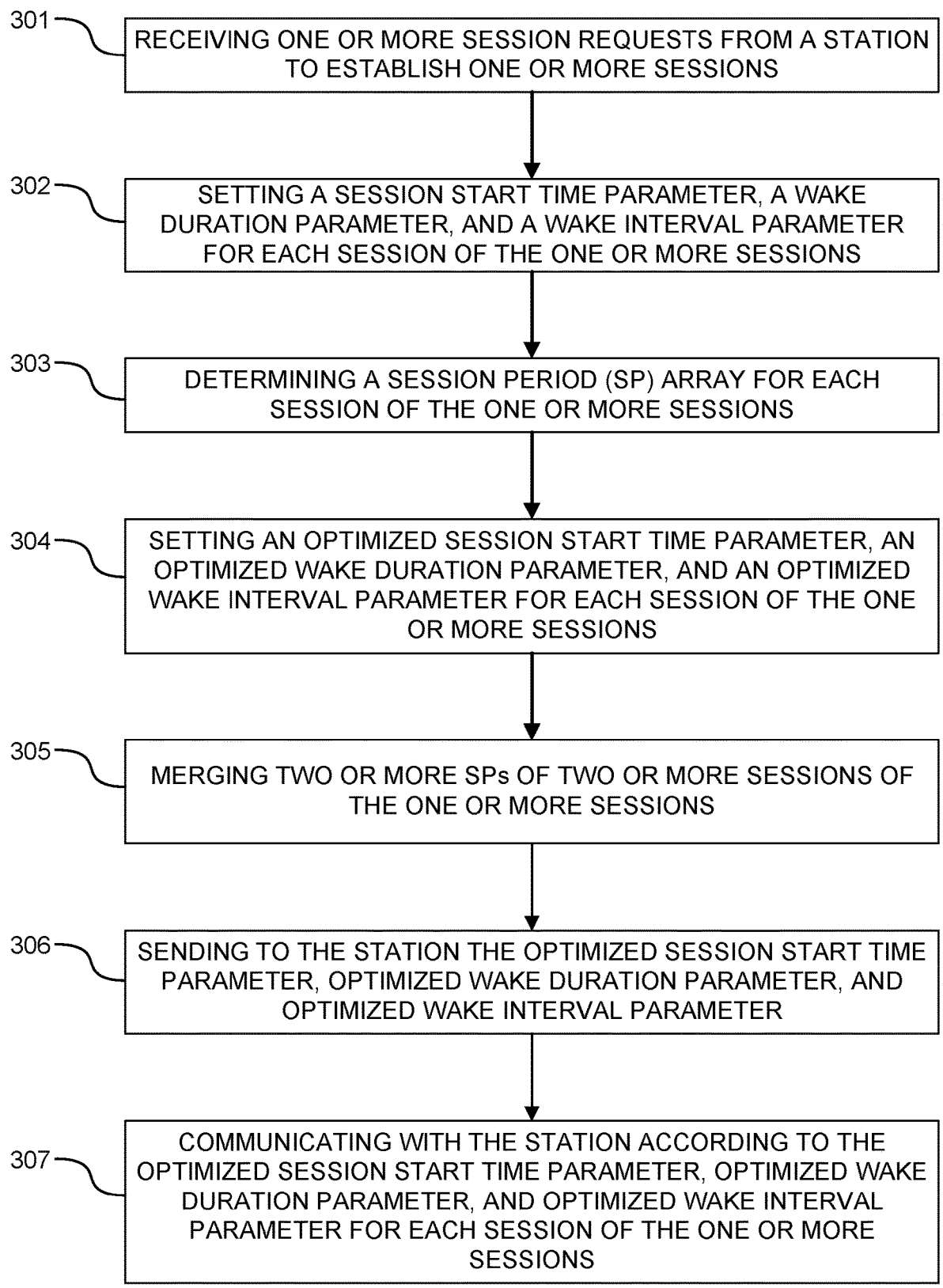

METHODS AND SYSTEMS FOR INCREASED POWER SAVE EFFICIENCY IN WIRELESS COMMUNICATIONS NETWORKS

DESCRIPTION OF RELATED ART

As density increases in wireless networks, the risk of contention and overlap between transmissions from multiple stations to and from an access point (AP) increases. Several approaches have been developed to address these issues through each evolution of wireless communications protocols. One way to reduce contention and increase spectral efficiency is to schedule when connected stations communicates with the AP.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 is an example method in accordance with embodiments of the technology disclosed herein.

Figure 1:
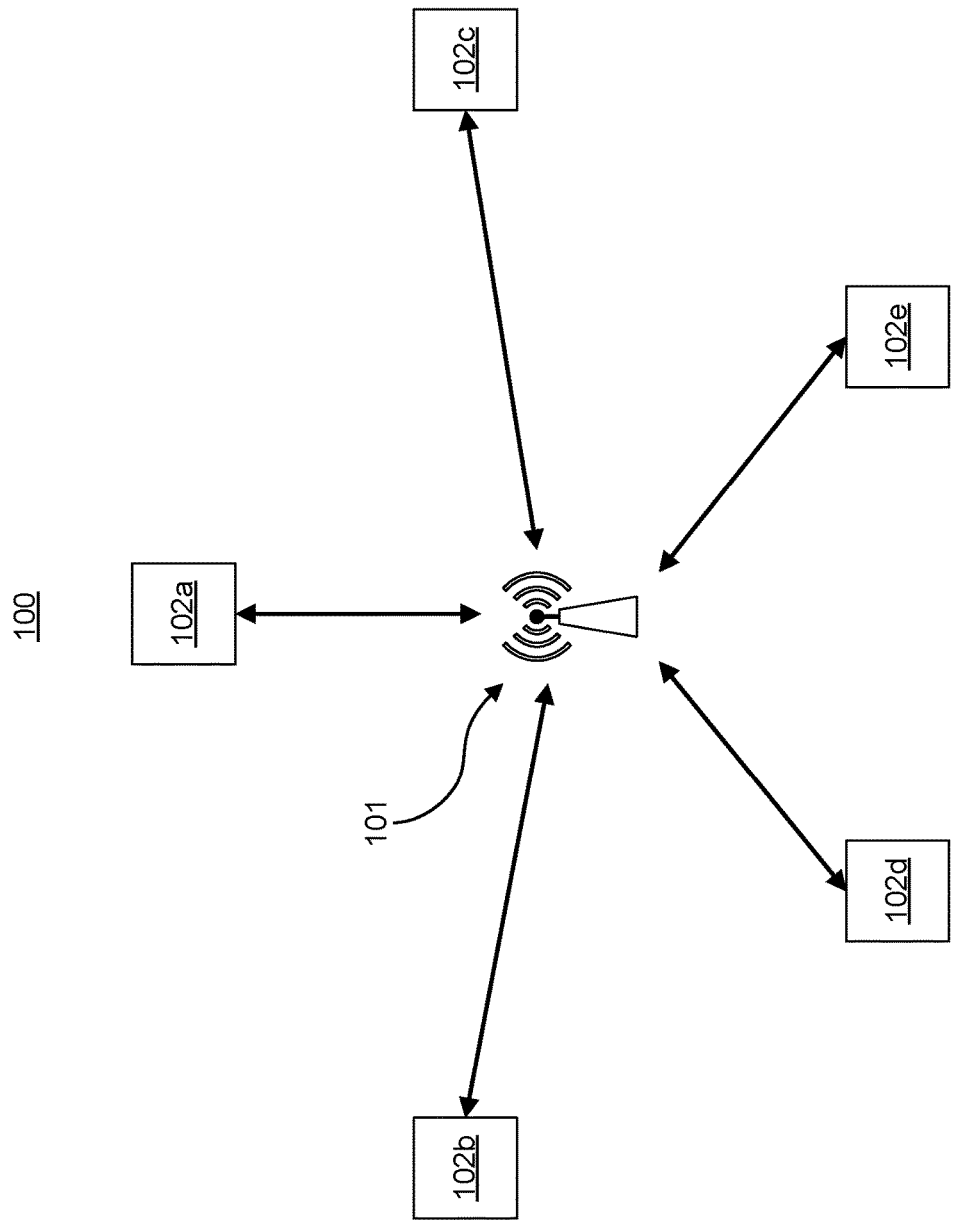
FIG. 1 illustrates an example wireless communications network in accordance with embodiments of the technology disclosed herein.

The figures are not exhaustive and do not limit the present disclosure to the precise form disclosed.

DETAILED DESCRIPTION

An example method of improving spectral efficiency within IEEE 802.11ax (referred to as WiFi 6) is Target wake time (TWT). TWT allows an access point (AP) in a wireless communications network to manage activity in order to minimize contention between stations (i.e., connected devices) and to reduce the required amount of time that a station needs to be awake. This is achieved by allocating stations to operate at non-overlapping times and/or frequencies, and to concentrate the frame exchanges between a station and the AP in predefined service periods (SPs). In addition to reducing contention, TWT also reduces the power consumption of connected devices by enabling the devices to enter a sleep mode during periods when it is not scheduled to communicate with the AP.

Although TWT enables connected devices (i.e., stations) to enter sleep mode in between scheduled periods, there is no specific method of arranging session parameters in multi-TWT session scenarios. In some wireless communications networks, each station can establish a plurality of session periods with an AP. As an example, in the WiFi 6 standard, each station is capable of establishing up to eight TWT sessions with an AP. Each of these TWT session periods (SPs) has its own set of TWT parameters, defining the SP. In establishing the TWT SPs, a connected station can include requested parameters, including a TWT start time, a TWT wake duration, and/or a TWT wake interval. Currently, there is no standard method of arranging the TWT SPs for a station to increase the power savings. Because of this, it is possible for a station with multiple TWT SPs to never enter sleep mode.

Embodiments of the present disclosure provide methods and systems for increasing the power save efficiency of stations within a wireless communications network. In various embodiments, the AP can be configured to optimize the session parameters for each session of one or more sessions between the AP and a station in the wireless communications network. The AP can modify received requested session parameters (e.g., session start time, wake duration, wake interval, etc.) such that the session periods of each session do not overlap two or more target beacon transmission time (TBTT) frames. Using the modified session parameters, the AP can then determine optimized session parameters to minimize the total wake time of the station when communicating with the AP. The AP can calculate a session period offset value for one or more sessions in various embodiments, the session period offset calculated to align the end time of one or more session periods of one or more sessions to the end time of a session period corresponding to a maximum session period duration. As discussed in greater detail below, embodiments of the technology enable for optimized scheduling of multiple sessions between a station and the AP, minimize the amount of time the station is awake to communicate over all established sessions and, accordingly, increase the power save efficiency of the station.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example wireless network 100 in which embodiments of the technology disclosed herein can be implemented. The wireless network 100 is provided for illustrative purposes only and should not be interpreted as limiting the scope of the technology to only the depicted network. The technology discussed herein is applicable within any wireless communications network where a station can establish multiple communication periods with an AP or other network device. As shown in FIG. 1, the example wireless network 100 includes a plurality of stations 102*a-e* (generally, "the station 102," collectively, "the stations 102") connected to an access point (AP) 101. Although only a single AP 101 is shown, the wireless network 100 can include a plurality of APs 101 in various embodiments. For ease of discussion, only a single AP 101 is illustrated.

The AP 101 comprises a network device configured to enable the connected devices 102 to access a wired network. In various embodiments, the AP 101 can comprise a device connected to a router, gateway, or other network access device, while in other embodiments the AP 101 can be integrated into a router, gateway, or other network access device. The AP 101 can be connected over one or more wired communication interfaces, including but not limited to Ethernet, Infiniband, Fibre Channel, among others. The AP 101 can connect to a plurality of stations 102, which can included but are not limited to smartphones, tablets, laptops, desktops, printers, servers, smart appliances (e.g., refrigerators, dishwashers), thermostats, among other devices having wireless connectivity functionality.

The AP 101 can be configured to establish one or more sessions with each station 102. In various embodiments, the sessions can be solicited or unsolicited. A solicited connection comprises a station 102 (e.g., station 102e) sending a session request message to the AP 101. In requesting a session, the station 102 can request one or more parameters defining the session. In various embodiments, the one or more session parameters can include but are not limited to a wake start time (i.e., an offset after which the first session period (SP) for the respective session will start), a wake duration (i.e., the maximum time for the station 102 to be awake), and a wake interval (i.e., the interval between successive SPs for the respective session), among other parameters. Each session can comprise a plurality of session periods (SPs), which are defined based on the session parameters.

For a solicited connection, the station 102 can include a requested wake start time, requested wake duration, requested wake interval, and other requested parameters in the session request sent to the AP 101. Upon receiving the session request, the AP 101 can analyze the requested session parameters and, in response, determine the plurality of session parameters for a respective session. In some embodiments, the plurality of determined session parameters can be the same as the requested session parameters included in the session request, while in other embodiments the AP 101 can set the plurality of determined session parameters to be different from the plurality of requested session parameters. In various embodiments, the AP 101 can send the plurality of determined session parameters to the requesting station 102, where the requesting station 102 can configure itself to communicate during the respective session in accordance with the plurality of determined session parameters. The requesting station 102 may be forced to conform to the plurality of determined session parameters in some embodiments, while in other embodiments the requesting station 102 and the AP 101 can perform one or more rounds of requests and responses. For unsolicited connections, the AP 101 can send a plurality of determined session parameters for a respective session without receiving a request from a station 102. In such embodiments, the determined session parameters can be determined based on other operating parameters of the AP 101, including but not limited to the number of other stations 102 connected thereto, the session parameters associated with one or more active sessions between the AP 102 and the respective station 102, the type of device comprising the station 102, among others. The AP 101 can send the determined session parameters for the unsolicited session to the station 102 and, in some embodiments, can mandate that the station 102 configure the session in accordance with the unsolicited plurality of determined session parameters.

Figure 2:
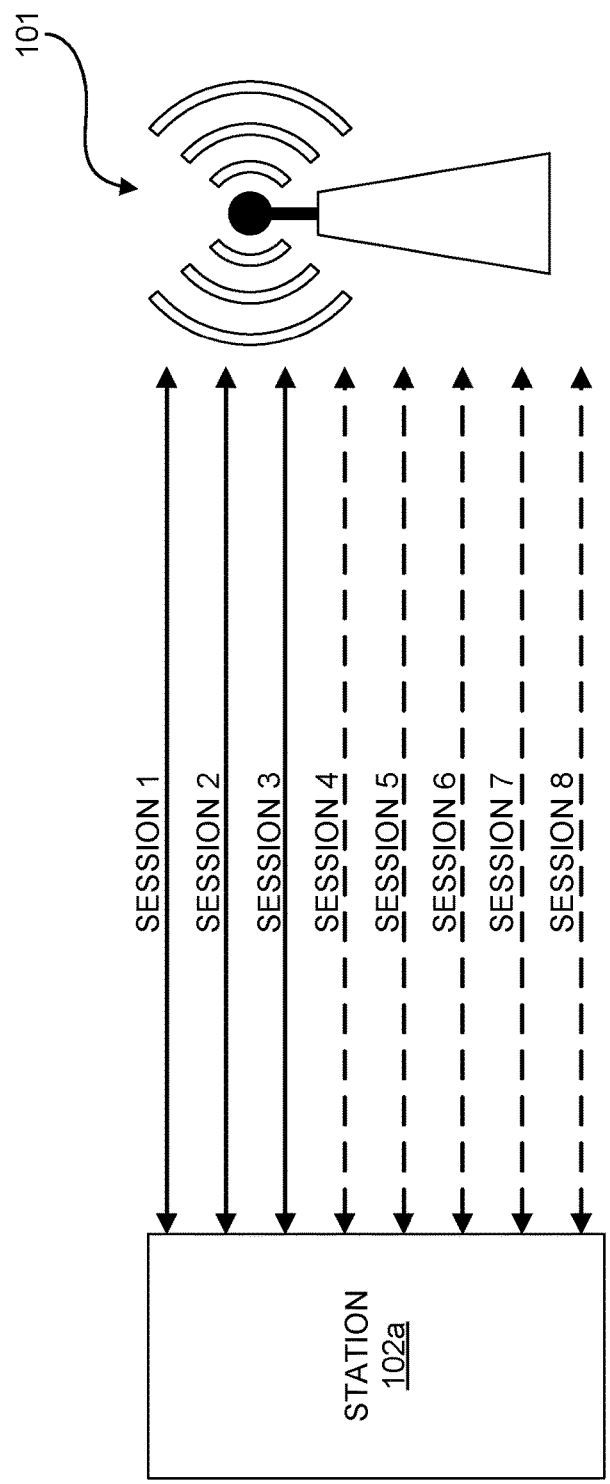
FIG. 2 illustrates an example multi-session relationship in accordance with embodiments of the technology disclosed herein.

As discussed above, in a wireless communications network a station 102 can establish multiple sessions with the AP 101 in various embodiments. FIG. 2 illustrates an example multi-session relationship 200 between a station 102a and an AP 101 in accordance with embodiments of the technology disclosed herein. The example multi-session relationship 200 is provided for illustrative purposes only and should not be interpreted as limiting the scope of the technology to only the depicted embodiment. For ease of discussion, the technology disclosed herein shall be discussed with respect to the TWT functionality included in the WiFi 6 standard, which allows up to eight sessions to be established between a given station (e.g., station 102a and an AP 101. Although discussed with respect to the WiFi 6 example, the technology disclosed herein is applicable to any wireless communications network where connected devices or stations are capable of establishing multiple communication session periods with an AP 101.

As shown in FIG. 2, the station 102a has a plurality of available sessions that it can establish with the AP 101. In various embodiments, the station 102a can have one or more established sessions with the AP 101. In the depicted example, the station 102a is shown to have three established sessions: session 1, session 2, and session 3 (indicated by the solid line). The remaining available sessions (Session 4 to Session 8) are not used (indicated by the broken line), but are available to the station 102a and/or the AP 101 to establish a new session if necessary. If the station 102a needs to establish another session, the station 102a can send a session request to the AP 101 to establish Session 4 with the AP 101. In some embodiments, the AP 101 can determine a new session is required and can establish Session 4 without receiving a request from the station 102a. In some embodiments, each session of the plurality of available sessions may be assigned to communicate one or more types of data. As a non-limiting example, session 1, session 3, and session 4 may be assigned to communicate voice data in the communications network, and session 2, session 5, and session 7 can be assigned to communicate sensor data. In some embodiments, a session may be assigned to communicate more than one data type. The number of data types may depend on the implementation. In some embodiments, each session of the plurality of available sessions can be assigned different priority levels, which can be used by the AP 101 in determining the plurality of sessions parameters defining the SPs of the respective session.

In current power save applications, such as the TWT functionality in WiFi 6, the APs do not optimize the session establishment and scheduling to reduce the overall power consumption of the stations. As a non-limiting example, a station may establish eight sessions with an AP, each session comprising different SPs based on its respective session parameters as negotiated with the AP. Because the AP does not consider the power consumption of the station, it is possible that the SPs between the plurality of sessions may overlap, resulting in the station remaining in an awake state at all times (i.e., never going to sleep to conserve power). Therefore, although the power saving functionality of the station being able to sleep in between SPs with the AP is enabled, in some contexts the communications network may not be receiving any intended benefits because the stations are never capable of entering a sleep mode. The technology disclosed herein provides a method of scheduling a plurality of sessions between a station and an AP to optimize the amount of time the station spends in a sleep mode, thereby increasing the power save efficiency of the network.

FIG. 3 is an example method 300 in accordance with embodiments of the technology disclosed herein. The method 300 is provided for illustrative purposes only and should not be interpreted as limiting the scope of the technology to only the depicted example. The method 300 may be performed by an AP operating within a wireless communications network, similar to the AP 101 discussed with respect to FIGS. 1 and 2. At operation 301, the AP can receive one or more session requests to establish one or more sessions from a station. The AP can be connected to a plurality of stations, and can be configured to receive one or more session requests from each connected station. For each station, the AP can perform the method 300 to optimize the session parameters individually for each station in various embodiments. In some embodiments, the AP can establish one or more sessions with a station without receiving a session request from the station (i.e., an unsolicited connection) where operation 301 may be skipped. Each of the one or more session requests from the station can include a plurality of requested sessions parameters. In various embodiments, the station can request specific session parameters for each session that it wishes to establish. Non-limiting examples of session parameters include a session start time parameter, a wake duration parameter, a wake interval parameter, among others. Although the station requests specific parameters for a particular session, the AP can disregard or modify the requested session parameters for each session during the negotiation period before sessions are established.

At operation 302, the AP can set a session start time parameter, a wake duration parameter, and a wake interval parameter for each session of the one or more sessions being established. In various embodiments, the session start time parameter, the wake duration parameter, and the wake interval parameter for each session set by the AP can be optimized such that the session periods (SPs) for each session do not overlap with two or more target beacon transmission time (TBTT) periods. A TBTT (or beacon frame) are periodic transmissions from the AP that announce the presence of the AP in the wireless communications network. A beacon frame may be transmitted in a plurality of wireless communications protocols to enable synchronization the AP with connected stations. As a non-limiting example, IEEE 802.11 local area network (LAN) protocols includes the TBTT period to allow devices within a basic service set (BSS) to synchronize, providing information concerning the capabilities and configuration of the network. To limit air resource contention between devices in the communications network, the elapsed time of the SPs of a given session should not be greater than the elapsed time of the TBTT period. The TBTT period comprises the elapsed time in between TBTT frames.

Figure 4A:
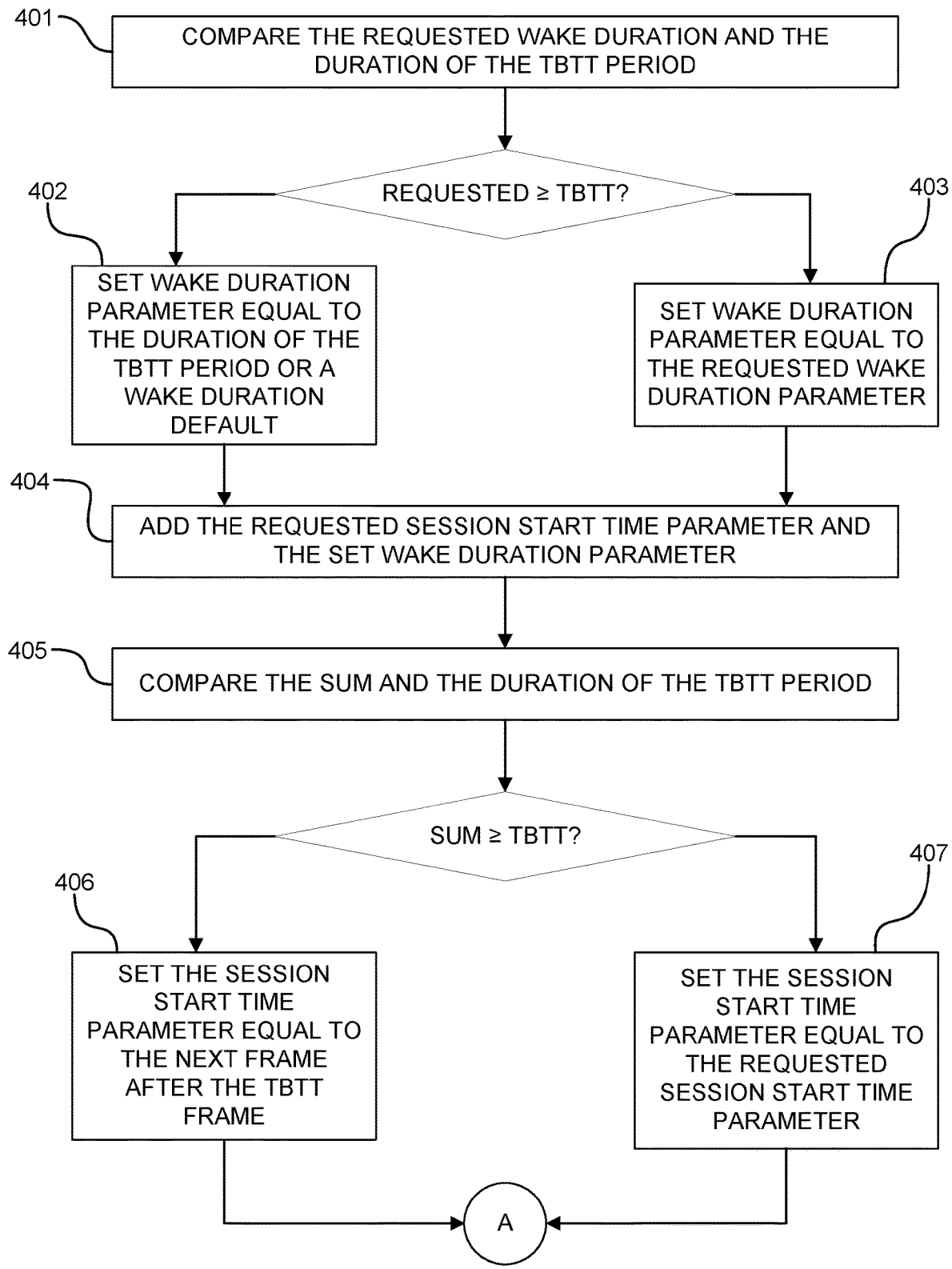
FIG. 4A is another example method in accordance with embodiments of the technology disclosed herein.
Figure 4B:
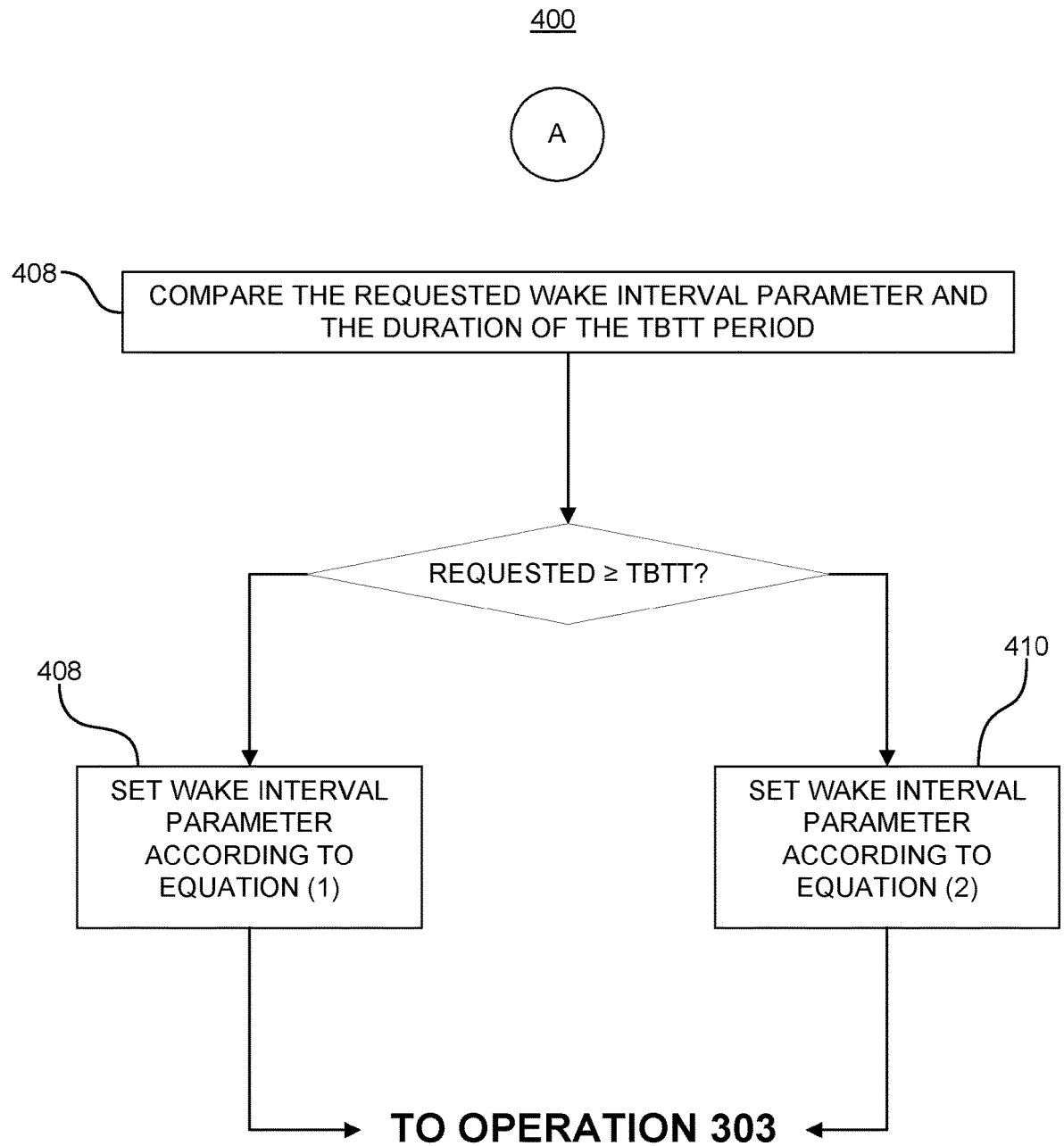
FIG. 4B is a continuation of the example method of FIG. 4A.

In various embodiments where one or more session requests are received by the AP, setting the parameters at operation 302 can comprise modifying the requested session parameters such that the SPs of the session meet certain requirements. FIGS. 4A and 4B illustrates an example method 400 in accordance with embodiments of the technology disclosed herein. The example method 400 can be performed at operation 302 of the method 300 discussed with respect to FIG. 3 to set the session parameters for each session. The example method 400 is provided for illustrative purposes only and should not be interpreted as limiting the scope of the technology to only the depicted embodiment. In various embodiments, one or more additional session parameters can be determined in method 400. As discussed above, the AP can be configured to modify the requested session parameters received for each session request to conform to one or more SP requirements. As a non-limiting example, an SP requirement can comprise the wake duration parameter for a session not exceeding the duration of a TBTT period. Referring to FIG. 4A, the AP can compare the requested wake duration parameter and the duration of the TBTT period in various embodiments. If the requested wake duration parameter is determined to exceed the duration of the TBTT period, the AP can be configured to set the wake duration parameter to be equal to the duration of the TBTT period at operation 402. In some embodiments, the AP can be configured to set the wake duration parameter to a wake duration default. The wake duration default can be a set duration time close to but not equal to the TBTT period. As a non-limiting example, the wake duration default can be set to a duration within the range of 95% of TBTT period to 99% of TBTT period. If the requested wake duration is determined to be less than the duration of the TBTT period, the wake duration parameter can be set as the requested wake duration parameter at operation 403. Where the requested wake duration parameter is less than the duration of the TBTT period, the duration alone would not cause the SP of the respective session to overlap two or more TBTT frames.

Another non-limiting SP requirement can be that each SP does not overlap two or more TBTT periods based on the session start time parameter. At operation 404, the AP can add the requested session start time parameter and the set wake duration parameter. The AP can then compare the sum of operation 404 and the duration of the TBTT period at operation 405 in various embodiments. If the sum is greater than the duration of the TBTT period the AP can set the session start time equal to the TBTT frame time at operation 406. Because the sum is greater than the duration of the TBTT period the SP would overlap at least two TBTT frames. Setting the session start time parameter equal to the next frame after a TBTT frame ensures that the SP would not overlap two or more TBTT frames. If the sum is determined to be less than the duration of the TBTT period, the session start time parameter can be set as the requested session start time parameter within the received session request at operation 407. In various embodiments, the requested session start time parameter can comprise a specific start time relative to the TBTT period, while in other embodiments the requested session start time parameter can comprise a requested SP offset. The SP offset can identify a delay in the session start time relative to the TBTT period. As a non-limiting example, the station could send a session request including a requested session start time parameter as ⅜ TBTT, meaning that the session would start after a TBTT frame but before the midpoint of the TBTT period prior to the next TBTT frame.

Another non-limiting SP requirement can be that the wake interval parameter for each session should be divisible by the TBTT period (or the TBTT period is divisible by the wake interval parameter). After setting the session start time parameter (at operation 406 or 407 of FIG. 4A), the method 400 can move to operation 408 of FIG. 4B. At operation 408, in various embodiments the AP can be configured to compare the requested wake interval parameter to the duration of the TBTT period. If the requested wake interval parameter is determined to be less than the TBTT period, the AP can be configured to set the wake interval parameter at operation 409 as:

$$\text{Wake}_{intvl_{resp}} = \frac{TBTT}{2\left[\log_2\left(\frac{TBTT}{\text{Wake}_{intvl_{req}}}\right)\right]}, \quad (1)$$

where $\text{Wake}_{intvl_{resp}}$ is the wake interval parameter and $\text{Wake}_{intvl_{req}}$ is the requested wake interval parameter. If the requested wake interval parameter is determined to be greater than or equal to the TBTT period, the AP can be configured to set the wake interval parameter to be aligned with the TBTT period, which can comprise rounding down to an integer at operation 410 as:

$$\text{Wake}_{intvl_{resp}} = TBTT \left[\frac{\text{Wake}_{intvl_{req}}}{TBTT}\right]. \quad (2)$$

Figure 5:
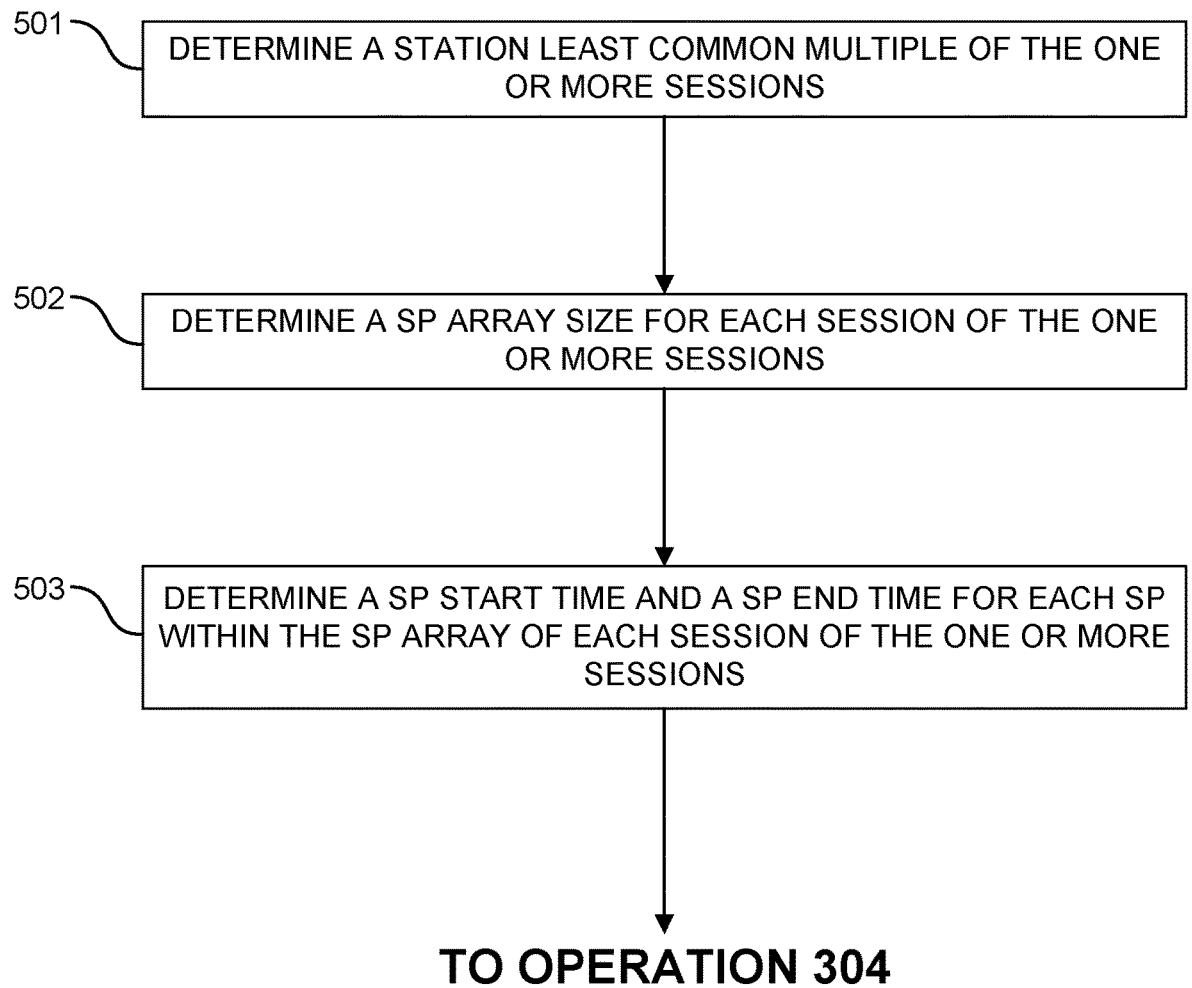
FIG. 5 is another example method in accordance with embodiments of the technology disclosed herein.

In various embodiments, after operations 409 or 410, the method 400 can return to operation 303 of the method 300 of FIG. 3. In various embodiments, at operation 303 the AP can determine a SP array for each session of the one or more sessions. A SP array comprises an order of sequential SPs for each session that falls within a SP array size. FIG. 5 is an example method 500 in accordance with embodiments of the technology disclosed herein. The example method 500 is provided for illustrative purposes only and should not be interpreted as limiting the scope of the technology to only the depicted embodiment. In various embodiments, the method 500 can be performed by the AP to determine the SP array for each session of the one or more sessions at operation 303 of the method 300. Referring to FIG. 5, at operation 501 the AP can determine a station least common multiple of the one or more sessions. The station least common multiple comprises the smallest positive integer that is divisible by all of the sessions of the one or more sessions. Each time a new session is to be established, the AP can be configured in various embodiments to determine a new station least common multiple. The station least common multiple can be used to determine the SP array size for each session.

At operation 502, the AP can determine a SP array size for each session of the one or more sessions. Determining the SP array size can be used to determine the number of SPs for each session that would occur within a period equal to the least common multiple. In various embodiments, the SP array size can be determined using equation (3):

$$SP_n \text{ array size} = \frac{STA_{LCM}}{\text{Wake}_{dur_n}}, \quad (3)$$

where $STA_{LCM}$ is the station least common multiple, $\text{Wake}_{dur_n}$ is the set wake duration parameter of the n session of the one or more sessions, wherein $1 \leq n \leq S_{max}$ where $S_{max}$ is the maximum number of available sessions between the station and the AP. The size of the SP array can include one or more SPs of a respective session, where the SP array can comprise a sequential order of the SPs.

To determine the sequential SPs within the SP array for a respective session, the AP can be configured to determine the SP start time and SP end time for each SP within the SP array at operation 503. Where more than one SP of a session is included within the SP array, each SP has a start time and an end time, with the set wake interval parameter defining the elapsed time between the start time of sequential SPs. In various embodiments, for each $SP_m$ (where m is the index indicating the ordered position of the sequential SP) of a session $S_n$, the SP start time can be determined as:

$$SP_{start} = S_{n_{start}} + (m * S_{n_{intvl}}), \quad (4)$$

where $SP_{start}$ is the start time for the m sequential SP, $S_{n_{start}}$ is the set session start time parameter for the n session $S_n$, m is the index of the sequential SP, and $S_{n_{intvl}}$ is the set wake interval parameter for $S_n$. As a non-limiting example, the $SP_{start}$ of the first sequential SP can be equal to the set session start time parameter, with the index m=0. The $SP_{start}$ of a second sequential SP would be equal to the set session start time parameter plus the set wake interval parameter for the n session, with the index m=1. The equation 3 can be used by the AP to identify the $SP_{start}$ for each sequential SP that is within the SP array size of the session. Using the $SP_{start}$ for a respective sequential SP, the session end time $SP_{end}$ can be calculated as:

$$SP_{end} = SP_{start} + S_{n_{intvl}}. \quad (5)$$

Figure 6:
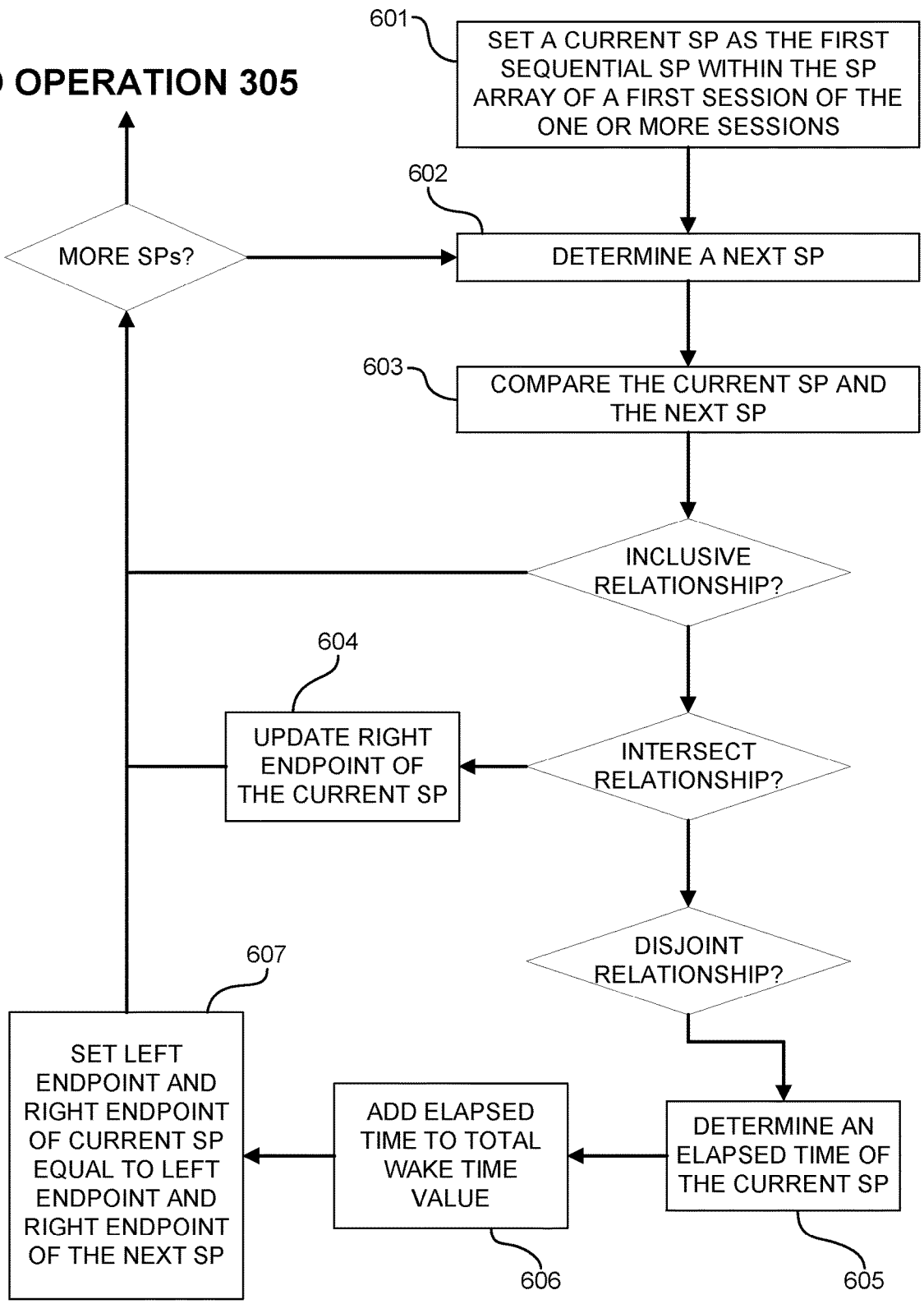
FIG. 6 illustrates another example method in accordance with embodiments of the technology disclosed herein.

Referring to FIG. 3, after determining the SP arrays for the sessions, at operation 304 the AP can set an optimized session start time parameter, optimized wake duration parameter, and optimized wake interval parameter for each session of the one or more sessions. By "optimized," the session parameters are set to minimize the total wake time of the station to communicate with the AP. Unlike current approaches, the technology disclosed herein takes the wake time of the station into account in setting the parameters for each session. FIG. 6 illustrates an example method 600 of setting the optimized session parameters in accordance with embodiments of the technology disclosed herein. The example method 600 is provided for illustrative purposes and should not be interpreted as limiting the scope of the technology to the depicted embodiment. As shown in FIG. 6, the method 600 can start at operation 601 where the AP sets a current SP as the first sequential SP within the SP array of a first session. Setting the current SP can comprise setting the left endpoint of the current SP as the SP start time of the first sequential SP and setting the right endpoint of the current SP as the SP end time of the first sequential SP in various embodiments.

After setting the current SP, the AP can then determine a next SP at operation 602. In various embodiments, the next SP can comprise the SP with a SP start time sequentially next after the SP start time of the current SP. The AP can identify the next sequential SP by checking the SP start times in the SP arrays for each of the sessions of the one or more sessions. Setting the next SP based on the next sequential SP, regardless of the session in which the SP occurs, the AP can identify SPs among all the sessions that are in an inclusive or intersect relationship.

The AP can compare the current SP and the next SP at operation 603. The AP compares the current SP and the next SP to determine the relationship of the current SP to the next SP. Two SPs can be in either an inclusive relationship, an intersect relationship, or a disjoint relationship. An inclusive relationship occurs where the left endpoint and the right endpoint of the next SP falls within the left endpoint and right endpoint of the current SP. In such a relationship, both SPs can be transmitted with the same wake duration of the station. In an intersect relationship, the right endpoint of the next SP falls outside of the right endpoint of the current SP, indicating that the next SP starts during the duration of the current SP but extends beyond the end of the current SP. In a disjoint relationship, the next SP falls completely outside of the current SP. In other words, there is a time gap between the right endpoint of the current SP and the left endpoint of the next SP.

If the current SP and the next SP are determined to be in an inclusive relationship, the AP can determine if there are any more SPs to be compared. If so, the AP can return to operation 602 and determine a new next SP. In an inclusive relationship the next SP is deemed to fall within the endpoints of the current SP, so no change of the current SP is necessary. If there are no more SPs (i.e., all of the SP arrays of all the sessions have been through the comparison), the method 600 can end and return to operation 305 of the method 300. If the AP determines the current SP and the next SP are in an intersect relationship, the AP can update the right endpoint of the current SP to be equal to the right endpoint of the next SP at operation 604. Resetting the right endpoint extends the length of the current SP to encompass both the current SP and the next SP. In this manner, the current SP used for the comparison is set such that the intersect SPs communicate within the same duration (from left endpoint to right endpoint). After resetting the right endpoint of the current SP, the AP can return to operation 602 to determine a new next SP, if the AP determines that there are more SPs to be analyzed (similar to that discussed above).

If the AP determines the current SP and the next SP are in a disjoint relationship, the AP can determine an elapsed time of the current SP at operation 605. The elapsed time of the current SP can be defined by the time from the left endpoint to the right endpoint. In various embodiments, this value can be considered the duration of the current SP, indicating the elapsed time in which the station would be awake for the current SP. The elapsed time of the current SP can be added to a total wake time value at operation 606. The total wake time value can be initialized as zero, with the total wake time value being determined based on the comparison. The AP can then set the left endpoint and the right endpoint of the current SP as the left endpoint and the right endpoint of the next SP, respectively, at operation 607. Updating the endpoints of the current SP serves to indicate a time gap between the compared SPs. The AP can then return to operation 602 to select a new next SP.

Once the calculation has been performed for all of the sessions of the one or more sessions, the AP can determine a duty cycle for the station. In various embodiments, the station duty cycle can be calculated as:

$$\text{Wake}_{total}/STA_{LCM}. \qquad (6)$$

where $\text{Wake}_{total}$ is the total wake time value. By dividing the total wake time value by the station least common multiple the overall energy efficiency of the session scheduling can be determined. The station duty cycle indicates the percentage of time the station is awake to communicate with the AP. To optimize the duty cycle, the embodiments of the technology disclosed herein can align the SPs of the one or more sessions so that more sessions are communicating within the same wake duration of the station. In this way, the number of times the station needs to wake up (or power on) is minimized. In various embodiments, the total number of wake up states is equal to the number of left endpoints determined according to methods 500 and 600. As stated above, more than one left endpoint can exist where a disjoint relationship is present between SPs.

Figure 7:
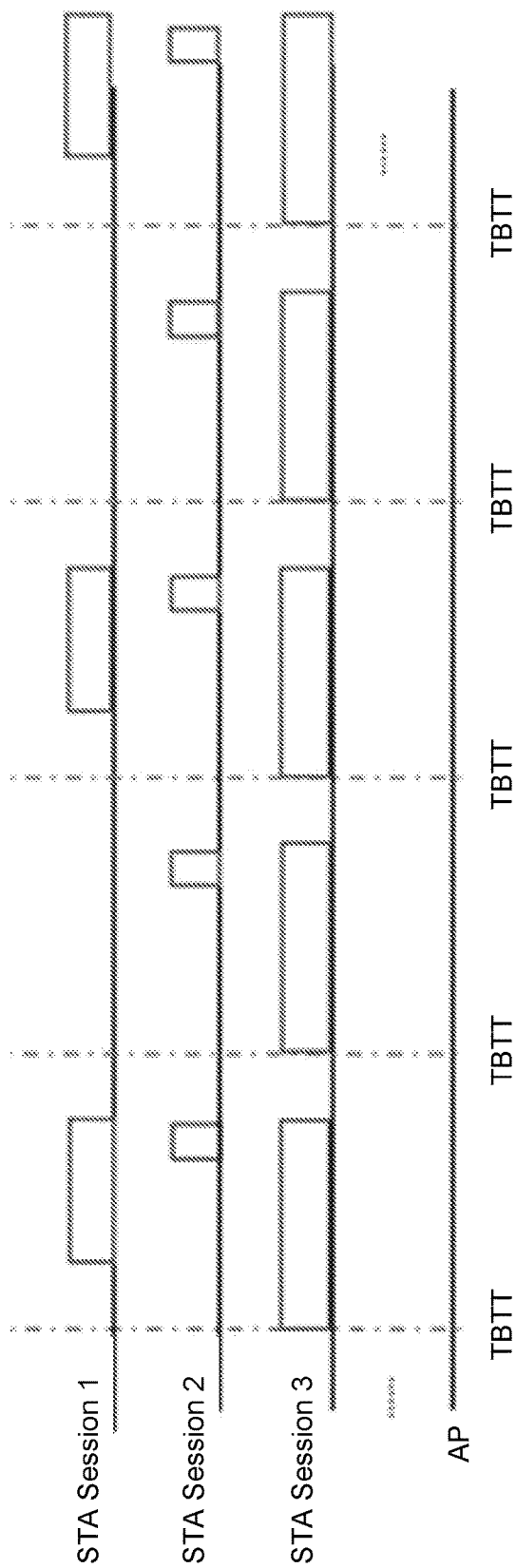
FIG. 7 illustrates an example merged communication flow in accordance with embodiments of the technology disclosed herein.

Referring back to FIG. 3, the AP can merge two or more SPs of two or more sessions of the one or more sessions at operation 305. As discussed above, the technology disclosed herein is directed towards minimizing the amount of time the station is awake to communicate over the established sessions. By merging two or more SPs, the station does not need to wake up multiple times to communicate with the AP over the different sessions, but is configured to communicate over multiple sessions within the same wake time of the station. FIG. 7 illustrates an example merged communication flow 700 in accordance with the embodiments of the technology disclosed herein. The example merged communication flow 700 is provided for illustrative purposes only and should not be interpreted as limiting the scope of the technology disclosed herein to only the depicted embodiment. For ease of discussion, the merged communication flow 700 is discussed with respect to a station STA having three sessions with the AP, but in other embodiments the station STA may have a plurality of sessions established with the AP.

As shown in FIG. 7, the station STA comprises three sessions: STA Session 1, STA Session 2, and STA Session 3. In various embodiments, for each station session, the optimized session parameters can be determined in a manner similar to that discussed with respect to method 300 of FIG. 3. With the optimized session parameters, the AP is aware of the scheduling of SPs within each station session. As shown in FIG. 7, the optimized wake duration parameter of STA Session 3 is longer than the optimized wake duration parameters of STA Session 1 or STA Session 2. To minimize the amount of times the station needs to wake up to communicate, the AP can align SPs of different sessions such that the SPs of the sessions have the same SP end time.

Figure 8:
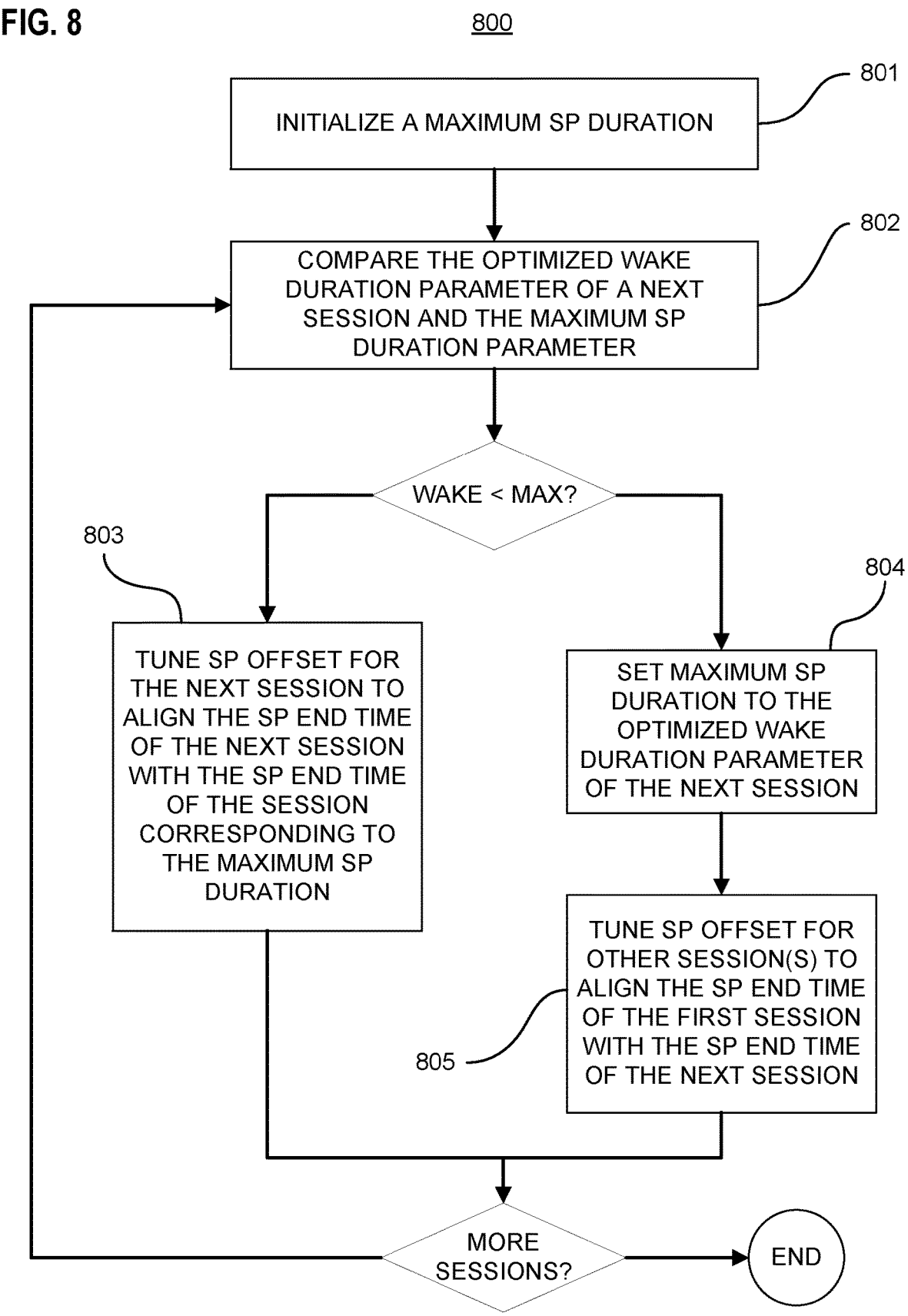
FIG. 8 is another example method in accordance with embodiments of the technology disclosed herein.

FIG. 8 illustrates an example method 800 for merging SPs in accordance with embodiments of the technology disclosed herein. The example method 800 is provided for illustrative purposes only and should not be interpreted as limiting the scope of the technology to only the depicted embodiment. The method 800 will be described with respect to the example merged communication flow 700 of FIG. 7. Referring to FIG. 8, the AP initialize a maximum SP duration at operation 801. The initial maximum SP duration is set to the optimized wake duration parameter of the first session in various embodiments. If only one session is established, the only SPs are those of the session, so the maximum SP duration would be equal to the optimized wake duration parameter of that session.

When more than one session is being established, the maximum SP duration is determined based on the optimized wake duration parameters of each session being established. In various embodiments, the AP could be establishing multiple sessions at the same time, while in other embodiments the AP can receive a request to establish one or more new sessions where the AP has already established at least one session with the station. At operation 802, the AP can compare the maximum SP duration and the optimized wake duration parameter of a next session. Where more than one session is being established, operation 802 can compare the maximum SP duration parameter against a first of the one or more sessions to be established. If the optimized wake duration parameter of the next session is less than the maximum SP duration, the AP can tune the SP offset for the next session to align the SP end time of the next session with the SP end time of the session corresponding to the maximum SP duration at operation 803. The SP offset is calculated such that the optimized session start time is delayed sufficiently to ensure alignment of merged SPs between sessions. As a non-limiting example, the offset value of STA Session 1 in FIG. 7 is set as ¼TBTT. Because the optimized wake duration parameter of STA Session 1 is ½TBTT, offsetting the start of the SP by ¼TBTT aligns the SP endpoint with the SP endpoint of the SP of STA Session 3, which has an optimized wake duration parameter (which is the maximum SP duration) of ¾TBTT. The SP offset is included in the optimized session start time parameter of the next session (e.g., the second session).

If the optimized wake duration parameter is greater than the maximum SP duration, the AP can set the maximum SP duration equal to the optimized wake duration parameter of the next session at operation 804. As a non-limiting example, the optimized wake duration parameter of STA Session 3 of FIG. 7 is greater than the maximum SP duration, which is set equal to the optimized wake duration parameter of STA Session 1. Therefore, setting the maximum SP duration to the optimized wake duration parameter of STA Session 3 enables the AP to align multiple SPs within the same maximum SP duration. After setting the maximum SP duration equal to the optimized wake duration parameter of the next session, the AP can tune the offset for each of the previous sessions to align the SP end times with the SP end time of the next session at operation 805. As a non-limiting example, the AP in FIG. 7 has compared the STA Session 1 and the STA Session 2 and determined that the optimized wake duration parameter of STA Session 2 is less than the maximum SP duration, so the AP can calculate a SP offset to align the SP of STA Session 2 with the SP of STA Session 1. When the STA Session 3 is to be established, the AP compares the optimized wake duration parameter of STA Session 3 to the maximum SP duration and identified that it is greater than the current maximum SP duration. As shown in FIG. 7, the AP can set the maximum SP duration to be equal to the optimized wake duration parameter of STA Session 3, and can tune the SP offsets for STA Session 1, STA Session 2, and STA Session 3. The AP can calculate the SP offset of STA Session 3 to be zero, establishing the optimized session start time parameter for STA Session 3 to be TBTT+$SP_{offset}$, where $SP_{offset}$ is the SP offset for STA Session 3, resulting in the SP offset being TBTT. The AP can calculate the SP offsets of STA Session 1 and STA Session 2 to align with the SP of the STA Session 3. In FIG. 7, the AP can determine the SP offset for STA Session 1 to be TBTT+¼TBTT and the SP offset for STA Session 2 to be TBTT+⅝TBTT.

After tuning the necessary SP offsets at operations 803-805, the AP can then determine if there are more sessions to be established. If all of the session SPs are aligned and there are no more sessions to be aligned, the AP can end the method 800 and set the optimized session start time parameter for each session to be TBTT+$SP_{offset}$, where $SP_{offset}$ is the SP offset tuned for the each session. For the session corresponding to the maximum SP duration, the $SP_{offset}$ is set to zero. If there are more sessions, the AP can return to operation 802 and continue performing operations 802-805 until SP offsets have been established for all sessions of the one or more sessions. The AP can add set the optimized session start time parameter for each session to TBTT+$SP_{offset}$ as calculated.

As stated above, the AP can establish sessions in an unsolicited matter, where the station does not send any request to the AP to establish a session. In such embodiments, the AP can be configured to set the session parameters without reference to any requested session parameters from the station. The AP can determine the SP array for each sessions based on its own determination of the session start time parameter, the wake duration parameter, and the wake interval parameter. The methods 300, 400, 500, 600, and 800 can be performed in a similar manner as in the solicited case.

Figure 9:
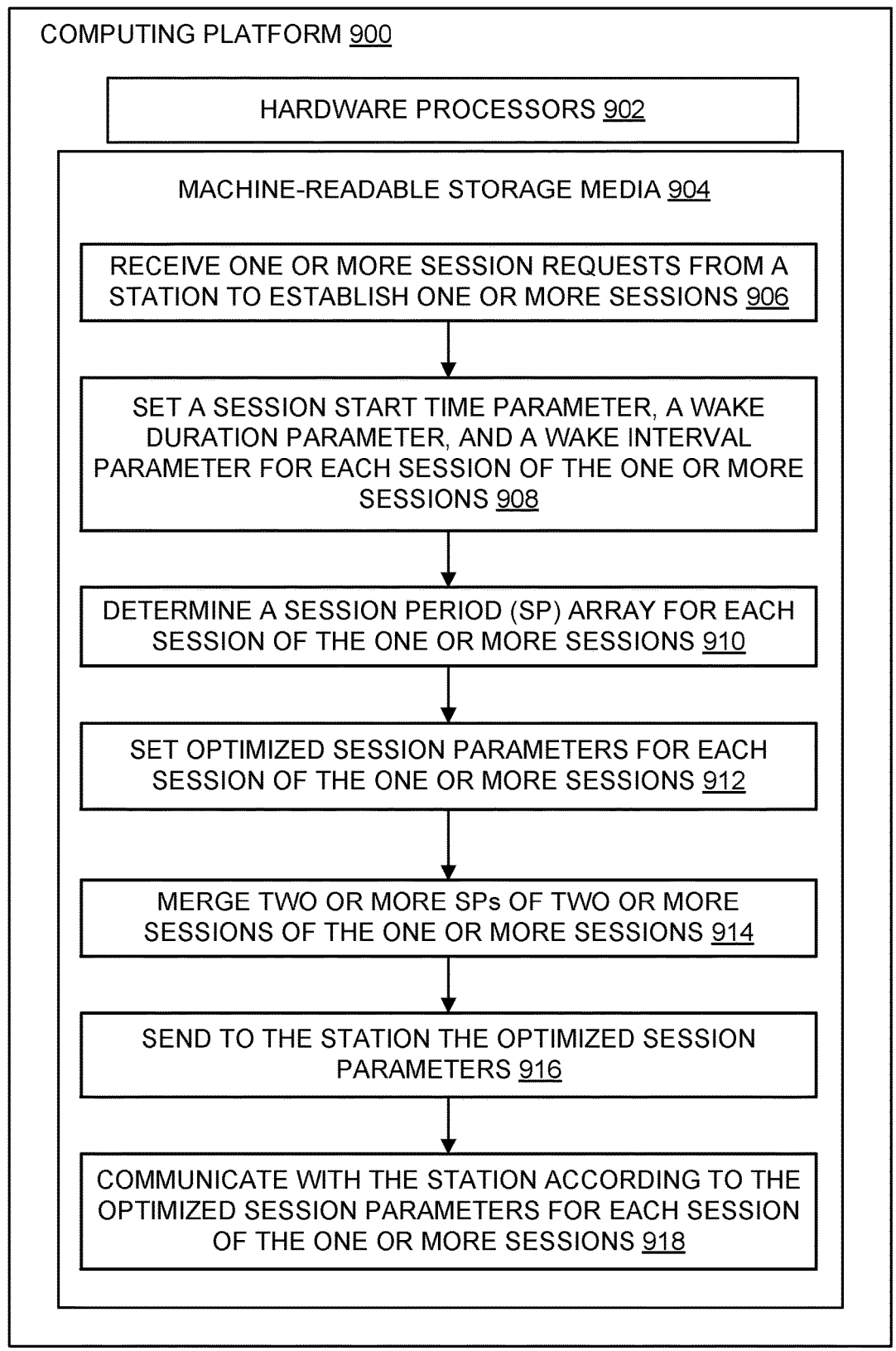
FIG. 9 is an example computing platform in accordance with embodiments of the technology disclosed herein.

FIG. 9 is an example computing platform 900 in accordance with embodiments of the present disclosure. Where operations and functionality of computing platform 400 are similar to those discussed with respect to FIGS. 1-8, the description should be interpreted to apply. In various embodiments, the computing platform 400 may be the AP discussed with respect to FIGS. 1-8 above. The computing platform 400 includes hardware processors 902. In various embodiments, the hardware processors 902 can comprise the processing circuitry of the AP discussed with respect to FIGS. 1-8. In some embodiments, the hardware processors 902 can comprise one or more hardware modules controllers configured to control access and/or control of other types of hardware modules of the computing platform 900.

Hardware processors 902 are configured to execute instructions stored on a machine-readable medium 904. Machine-readable medium 904 may be one or more types of non-transitory computer storage mediums. Non-limiting examples includes: flash memory, solid state storage devices (SSDs), a storage area network (SAN), removable memory (e.g., memory stick, CD, SD cards, etc.), or internal computer RAM or ROM, among other types of computer storage mediums. In various embodiments, the machine-readable storage medium 904 can be similar to the non-transitory machine-readable storage medium discussed with respect to FIGS. 1 and 2. The instructions stored on the machine-readable medium 904 may include various sub-instructions for performing the function embodied by the identified functions. For example, the instruction "Receive one or more session requests from a station to establish one or more sessions" 906 may include various sub-instructions for detecting session requests received from a connected station, similar to the manner discussed above with respect to FIGS. 1-8. In various embodiments, the sub-instructions may include receiving one or more session requests from a plurality of connected stations in a wireless communications network, similar to the wireless communications network discussed with respect to FIGS. 1-2. In various embodiments, the sub-instructions may include identifying a set of requested session parameters included in each session request, similar to the requested session parameters discussed with respect to FIGS. 3-8.

The instruction "set a session start time parameters, a wake duration parameter, and a wake interval parameter for each session of the one or more sessions" 908 can include various sub-instructions for setting an initial set of session parameters based on the requested session parameters, in a manner similar to that discussed with respect to FIGS. 1-8. In various embodiments, the sub-instructions can include determining the session parameters according to equations 1 and 2 discussed above with respect to FIGS. 4A and 4B. The instruction "Determine a session period (SP) array for each session of the one or more sessions" 910 can include various sub-instructions in a manner similar to that discussed with respect to FIG. 5 above. In various embodiments, the instruction may include sub-instructions to determine a station least common multiple of the one or more sessions in a manner similar to that discussed above with respect to FIG. 5.

The instruction "Set optimized session parameters for each session of the one or more sessions" 912 can include sub-instructions to perform operations similar to that of method 600 discussed with respect to FIG. 6. In various embodiments, the instruction can include sub-instructions to determine if two SPs are in an inclusive relationship, intersect relationship, or disjoint relationship, similar to the manner discussed above with respect to FIG. 6. In some embodiments, the instruction can include sub-instructions to determine a total wake time value in a manner similar to that discussed above with respect to FIG. 6. The instruction "Merge two or more SPs of two or more sessions of the one or more sessions" 914 can include sub-instructions to align two or more SPs of the one or more sessions in a manner similar to that discussed above with respect to FIGS. 7 and 8. In various embodiments, the instruction can include sub-instructions to determine a maximum SP duration in a manner similar to that discussed with respect to FIGS. 7 and 8. In some embodiments, the instruction can include sub-instructions for determining a SP offset for each session of the one or more sessions in a manner similar to that discussed above with respect to FIGS. 7 and 8. The instruction "Send to the station the optimized sessions parameters" 916 can include various sub-instructions to communicate the optimized session parameters to the station in a manner similar to that discussed with respect to FIGS. 1-8. The instruction "Communicate with the station according to the optimized session parameters for each session of the one or more sessions" 918 can include various sub-instructions for communicating with the station according to the schedule defined by the optimized session parameters in a manner similar to that discussed above with respect to FIGS. 1-8.

Figure 10:
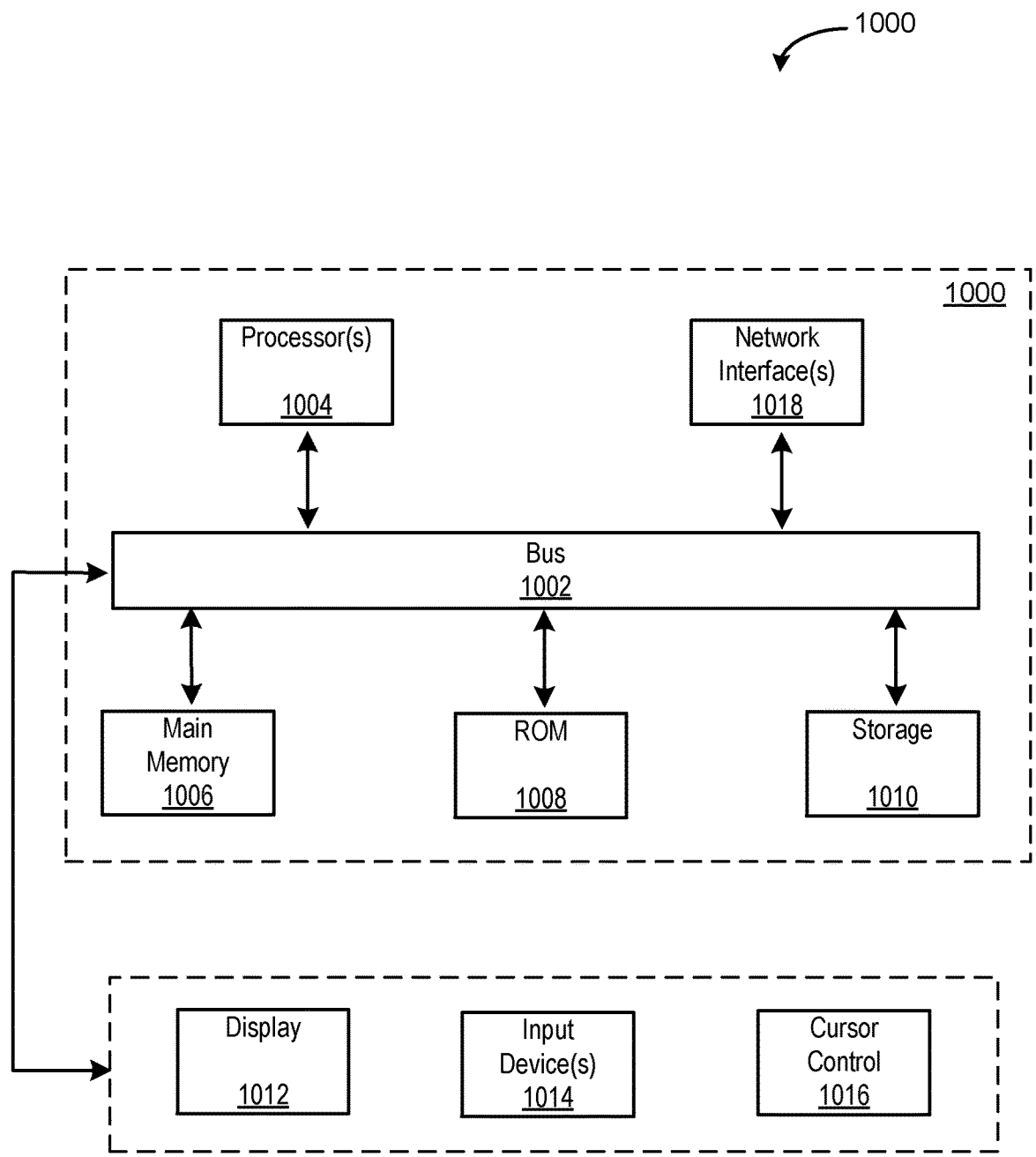
FIG. 10 is an example computing component that may be used to implement various features of embodiments described in the present disclosure.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network (s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving, by an access point (AP) in a wireless communications network, one or more session requests from a station to establish a session of a plurality of available sessions;
   setting, by the AP, a session start time parameter, a wake duration parameter, and a wake interval parameter for each session of the one or more sessions;
   determining, by the AP, a session period (SP) array for each session of the one or more sessions based on the respective session start time parameter, wake duration parameter, and wake interval parameter;
   setting, by the AP, an optimized session start time parameter, an optimized wake duration parameter, and an optimized wake interval for each session of the one or more sessions based on the one or more SP arrays; and
   sending, by the AP, the optimized session start time parameter, the optimized wake duration parameter, and the optimized wake interval for each session of the one or more sessions to the station, wherein the optimized session start time parameter, the optimized wake duration parameter, and the optimized wake interval are set such that a total wake time of the station is minimized.

2. The method of claim 1, wherein:
the session request for each session of the one or more sessions includes a requested session start time parameter, a requested wake duration parameter, and a requested wake interval parameter; and
the session start time parameter, the wake duration parameter, and the wake interval parameter set for each session is based on the requested session start time parameter, the requested wake duration parameter, and the requested wake interval parameter,
wherein the session start time parameter, the wake duration parameter, and the wake interval parameter of each session of the one or more sessions is set to minimize a total wake time of the station.

3. The method of claim 2, setting the wake duration parameter comprises:
calculating a sum of the requested session start time parameter and the requested wake duration parameter;
comparing the sum and a duration of a target beacon transmission time (TBTT) period; and
in response to determining the sum is greater than the duration of the TBTT period, setting the wake duration parameter equal to the duration of the TBTT period.

4. The method of claim 2, setting the wake interval parameter comprises:
comparing the requested wake interval parameter and an elapsed time of a target beacon transmission time (TBTT) period for each session of the one or more sessions; and
in response to determining the requested wake interval parameter is less than the elapsed time of the TBTT period, setting the wake interval parameter of the respective session as:

$$Wake_{intvl_{resp}} = \frac{TBTT}{2^{\left[\log_2\left(\frac{TBTT}{Wake_{intvl_{req}}}\right)\right]}},$$

where $Wake_{intvl_{resp}}$ is the wake interval parameter and $Wake_{intvl_{req}}$ is the requested wake interval parameter; and
if the requested wake interval is equal to or greater than the elapsed time of the TBTT period, setting the wake interval parameter of the respective session as:

$$Wake_{intvl_{resp}} = TBTT\left[\frac{Wake_{intvl_{req}}}{TBTT}\right].$$

5. The method of claim 1, determining the session period (SP) array for each session of the one or more sessions comprises:
determining a station least common multiple between each session of the one or more sessions;
determining a size of the SP array for each session of the one or more sessions based on the station least common multiple and the wake duration parameter for each session; and
determining a SP array start time and a SP array end time for each sequential SP of one or more sequential SPs within the size of the SP array for each session.

6. The method of claim 5, wherein the size of the SP array for each session comprises $$STA_{LCM}/Wake_{dur_n},$$

where $STA_{LCM}$ is the station least common multiple, $Wake_{dur_n}$ is the wake duration parameter for a respective session of the one or more sessions, and n indicates the respective session of the one or more sessions.

7. The method of claim 5, wherein for each sequential SP within the size of the SP array:
the SP array start time is:

$$SPn_{start} = Sn_{start} + (index * Sn_{interval}),$$

where $SPn_{start}$ is the SP array start time for a sequential SP of the one or more sequential SPs, $Sn_{start}$ is the session start time parameter of the respective session (Sn), index is an indication of the sequential SP, and $Sn_{interval}$ is the wake interval parameter of the respective session; and
the SP array end time is:

$$SPn_{end} = SPn_{start} + Sn_{intvl},$$

where $SPn_{end}$ is the SP array end time for the sequential SP.

8. The method of claim 7, wherein setting the optimized session start time parameter, the optimized wake duration parameter, and the optimized wake interval for each session of the one or more sessions based on the one or more SP arrays comprises:
setting a current SP as a first sequential SP of a first session, a left endpoint of the current SP comprising the SP array start time of the first sequential SP and a right endpoint of the current SP comprising the SP array end time of the first sequential SP;
comparing a next SP to the current SP, wherein the next SP is a second sequential SP of the first session; and
iterating the comparing for each sequential SP of each session of the one or more sessions based on the SP arrays.

9. The method of claim 8, wherein comparing, a next SP to the current SP, comprises:
in response to determining a left endpoint and a right endpoint of the next SP falls within the left endpoint and the right endpoint of the current SP, selecting a new next SP;
in response to determining the right endpoint of the next SP falls outside the right endpoint of the current SP:
updating the right endpoint of the current SP to the right endpoint of the next SP; and
selecting a new next SP; and
in response to determining neither the left endpoint and the right endpoint of the next SP do not fall within the left endpoint and the right endpoint of the current SP:
determining an elapsed time of the current SP, the elapsed time defined by the left endpoint and the right endpoint of the current SP;
adding the elapsed time to a total wake time value;
updating the left endpoint of the current SP to the left endpoint of the next SP and updating the right endpoint of the current SP to the right endpoint of the next SP; and
selecting a new next SP.

10. The method of claim 9, further comprising calculating a duty cycle for the station as:

$$\text{Duty Cycle} = \frac{\text{Wake}_{total}}{STA_{LCM}},$$

wherein Wake$_{total}$ is the total wake time value.

11. The method of claim 8, further comprising:
determining if the SP array of the first session includes more than one sequential SP;
in response to determining the SP array of the first session does not include more than one sequential SP, setting a first sequential SP of a second session as the next SP; and
in response to determining the SP array of the first session does include more than one sequential SP, setting a second sequential SP of the first session as the next SP.

12. A system comprising:
an access point (AP);
a station communicatively coupled to the AP over a wireless communication channel;
the AP configured to:
receive one or more session requests from the station to establish a session of a plurality of available sessions;
set a session start time parameter, a wake duration parameter, and a wake interval parameter for each session of the one or more sessions;
determine a session period (SP) array for each session of the one or more sessions based on the respective session start time parameter, wake duration parameter, and wake interval parameter;
set an optimized session start time parameter, an optimized wake duration parameter, and an optimized wake interval for each session of the one or more sessions based on the one or more SP arrays; and
send the optimized session start time parameter, the optimized wake duration parameter, and the optimized wake interval for each session of the one or more sessions to the station,
wherein the optimized session start time parameter, the optimized wake duration parameter, and the optimized wake interval are set such that a total wake time of the station is minimized.

13. The system of claim 12, further comprising a plurality of stations, each station of the plurality of stations communicatively coupled to the AP, each station associated with a plurality of available sessions with the AP.

14. The system of claim 13, wherein the AP is configured to receive one or more session requests from each station of the plurality of stations.

15. The system of claim 12, wherein:
the session request for each session of the one or more sessions includes a requested session start time parameter, a requested wake duration parameter, and a requested wake interval parameter; and
the session start time parameter, the wake duration parameter, and the wake interval parameter set for each session is based on the requested session start time parameter, the requested wake duration parameter, and the requested wake interval parameter,
wherein the session start time parameter, the wake duration parameter, and the wake interval parameter of each session of the one or more sessions is set to minimize a total wake time of the station.

16. The system of claim 12, wherein the AP is configured to determine the optimized session start time parameter, the optimized wake duration parameter, and the optimized wake interval parameter for each session of the one or more sessions each time a new session is established between the station and the AP.

17. The system of claim 12, determine the session period (SP) array for each session of the one or more sessions comprises:
determine a station least common multiple between each session of the one or more sessions;
determine a size of the SP array for each session of the one or more sessions based on the station least common multiple and the wake duration parameter for each session; and
determine a SP array start time and a SP array end time for each sequential SP of one or more sequential SPs within the size of the SP array for each session.

18. The system of claim 17, wherein the size of the SP array for each session comprises $$STA_{LCM}/\text{Wake}_{dur_n},$$

where $STA_{LCM}$ is the station least common multiple, Wake$_{dur_n}$ is the wake duration parameter for a respective session of the one or more sessions, and n indicates the respective session of the one or more sessions.

19. The system of claim 17, wherein for each sequential SP within the size of the SP array:
the SP array start time is:

$$SPn_{start}=Sn_{start}+(\text{index}*Sn_{interval}),$$

where SPn$_{start}$ is the SP array start time for a sequential SP of the one or more sequential SPs, Sn$_{start}$ is the session start time parameter of the respective session (Sn), index is an indication of the sequential SP, and Sn$_{interval}$ is the wake interval parameter of the respective session; and
the SP array end time is:

$$SPn_{end}=SPn_{start}+Sn_{intvl},$$

where SP$_{end}$ is the SP array end time for the sequential SP.

20. A method comprising:
determining, by an access point (AP) in a wireless communications network, to establish a session with a station communicatively coupled to the AP;
setting, by the AP, a session start time parameter, a wake duration parameter, and a wake interval parameter for the session;
determining, by the AP, a session period (SP) array for the session comprising:
determining a station least common multiple between the session and one or more established sessions;
determining a size of the SP array for the session and for the one or more established sessions based on the station least common multiple and the wake duration parameter of the session and the one or more established sessions; and
determining a SP array start time and a SP array end time for each sequential SP of one or more sequential SPs within the size of the SP array for the session and for the one or more established sessions;
setting, by the AP, an optimized session start time parameter, an optimized wake duration parameter, and an optimized wake interval for the session and for each established session of the one or more established sessions based on the SP arrays; and
sending, by the AP, the optimized session start time parameter, the optimized wake duration parameter, and the optimized wake interval for the session and for each established session of the one or more established sessions to the station, wherein the optimized session start time parameter, the optimized wake duration parameter, and the optimized wake interval are set such that a total wake time of the station is minimized.

\* \* \* \* \*